US008354951B2

(12) United States Patent
Guigné et al.

(10) Patent No.: US 8,354,951 B2
(45) Date of Patent: Jan. 15, 2013

(54) SHORT BASELINE HELICOPTER POSITIONING RADAR FOR LOW VISIBILITY

(75) Inventors: Jacques Y. Guigné, Paradise (CA); James A. Stacey, Paradise (CA); Nicholas G. Pace, Bath (GB)

(73) Assignee: Intelligent Sciences, Ltd., Paradise, NL (CA)

( * ) Notice: Subject to any disclaimer, the term of this patent is extended or adjusted under 35 U.S.C. 154(b) by 302 days.

(21) Appl. No.: 12/768,793

(22) Filed: Apr. 28, 2010

(65) Prior Publication Data

US 2010/0328138 A1 Dec. 30, 2010

Related U.S. Application Data (60) Provisional application No. 61/176,360, filed on May 7, 2009.

(51) Int. Cl.
*G01S 13/00* (2006.01)
(52) U.S. Cl. .......... 342/33; 342/118; 342/120; 342/127; 342/146
(58) Field of Classification Search .............. 342/33–40, 342/118, 120–122, 127–133, 146, 147
See application file for complete search history.

(56) References Cited

U.S. PATENT DOCUMENTS

| | | | | |
|---|---|---|---|---|
| 2,437,695 A * | 3/1948 | Jansky | ........................... | 342/465 |
| 3,659,085 A * | 4/1972 | Potter et al. | ................... | 701/518 |
| 4,232,313 A * | 11/1980 | Fleishman | ..................... | 342/36 |
| 4,740,792 A * | 4/1988 | Sagey et al. | ................... | 342/457 |
| 5,099,245 A * | 3/1992 | Sagey | ....................... | 342/357.2 |
| 5,191,342 A * | 3/1993 | Alsup et al. | ................... | 342/465 |
| 5,200,748 A * | 4/1993 | Attfield | ......................... | 340/953 |
| 5,534,876 A * | 7/1996 | Erickson et al. | ............. | 342/387 |
| 5,583,517 A * | 12/1996 | Yokev et al. | ................... | 342/457 |
| 5,596,330 A * | 1/1997 | Yokev et al. | ................... | 342/387 |
| 5,724,047 A * | 3/1998 | Lioio et al. | .................... | 342/442 |
| 5,999,116 A * | 12/1999 | Evers | .............................. | 342/36 |
| 5,999,131 A * | 12/1999 | Sullivan | ........................ | 342/465 |
| 6,094,169 A * | 7/2000 | Smith et al. | ................... | 342/465 |
| 6,211,811 B1 * | 4/2001 | Evers | .............................. | 342/36 |
| 6,243,587 B1 * | 6/2001 | Dent et al. | ................. | 455/456.2 |
| 6,366,240 B1 * | 4/2002 | Timothy et al. | ............... | 342/417 |
| 6,407,703 B1 * | 6/2002 | Minter et al. | .................. | 342/450 |
| 6,477,163 B1 * | 11/2002 | Miller | .......................... | 370/347 |
| 6,816,105 B2 * | 11/2004 | Winner et al. | .................. | 342/37 |
| 7,019,682 B1 * | 3/2006 | Louberg et al. | ................. | 342/22 |
| 7,170,441 B2 * | 1/2007 | Perl et al. | ......................... | 342/29 |
| 7,313,143 B1 * | 12/2007 | Bruno | ........................ | 370/395.4 |
| 7,365,652 B2 * | 4/2008 | Scherbarth | .................... | 340/974 |
| 7,541,968 B2 * | 6/2009 | Hall et al. | ........................ | 342/28 |
| 7,570,194 B2 * | 8/2009 | Galati | ............................. | 342/30 |
| 7,642,929 B1 * | 1/2010 | Pinkus et al. | .................. | 340/973 |
| 8,019,360 B2 * | 9/2011 | Qahwash | .................. | 455/456.5 |
| 8,026,850 B2 * | 9/2011 | Seong et al. | ................... | 342/387 |

(Continued)

*Primary Examiner* — Jack W Keith
*Assistant Examiner* — Peter Bythrow
(74) *Attorney, Agent, or Firm* — Richard A. Fagin (57) ABSTRACT

A method for determining position and orientation of a rotating wing aircraft (e.g. helicopter) with respect to a ground station includes transmitting an electromagnetic signal from the aircraft. The signal includes a plurality of electromagnetic signals, each signal having a different selected frequency. The signal is detected at an array of sensors disposed on the ground surface in a selected pattern. The array includes at least one reference sensor and at least three spaced apart time difference determination sensors. A difference in arrival time of the signals between the reference sensor and each of the time difference determination sensors is determined and a spatial position of the aircraft is determined from the time differences.

15 Claims, 5 Drawing Sheets

U.S. PATENT DOCUMENTS

| | | | |
|---|---|---|---|
| 8,138,967 B2* | 3/2012 | Weedon | 342/126 |
| 2003/0142002 A1* | 7/2003 | Winner et al. | 342/36 |
| 2004/0032363 A1* | 2/2004 | Schantz et al. | 342/127 |
| 2005/0206555 A1* | 9/2005 | Bridgelall et al. | 342/127 |
| 2008/0231494 A1* | 9/2008 | Galati | 342/37 |
| 2008/0291089 A1* | 11/2008 | Seong et al. | 342/387 |
| 2009/0002220 A1* | 1/2009 | Lovberg et al. | 342/33 |
| 2009/0138138 A1* | 5/2009 | Ferren et al. | 701/3 |
| 2012/0075138 A1* | 3/2012 | Stayton et al. | 342/120 |

* cited by examiner

SHORT BASELINE HELICOPTER POSITIONING RADAR FOR LOW VISIBILITY

CROSS-REFERENCE TO RELATED APPLICATIONS

Priority is claimed from U.S. Patent Application No. 61/176,360 filed on May 7, 2009

STATEMENT REGARDING FEDERALLY SPONSORED RESEARCH OR DEVELOPMENT

Not applicable.

BACKGROUND OF THE INVENTION

1. Field of the Invention

The invention relates generally to the field of rotating wing aircraft (e.g. helicopter) position and orientation determination using radar. More specifically, the invention relates to devices and methods applied to enhance safety of helicopter landing under brownout (sand and/or dust) or whiteout (snow and/or fog) conditions created by the aircraft's main-rotor down-wash, under which near-ground flight is particularly perilous due to the sudden loss of visual cues on which the pilot depends.

2. Background Art

United States Defense Advanced Research Projects Agency (DARPA) Broad Agency Announcement No. BAA 06-45 requests solicitations for proposals to deal with affordable solutions to the problem of helicopter landing in brownout as well as other degraded visual environments (DVEs) such as whiteouts caused by snow and/or fog. Solutions are needed for the brownout phenomenon, which causes deadly accidents during helicopter landing and take-off operations in arid desert terrain. Intense, blinding dust clouds, which may be stirred up by the aircraft's main-rotor down-wash during near-ground flight can cause helicopter pilots to suddenly lose all visual cues. This creates significant flight safety risks from aircraft and ground obstacle collisions, rollover due to sloped and uneven terrain, etc.

What is needed is a sensor/visualization-display system that will effectively provide an affordable, landing capability in brownout/DVE conditions where the visibility is temporarily as low as zero with zero landing-zone infrastructure and limited knowledge of the terrain comprising the landing area. The invention may also be permanently deployed as an integral safety feature for landing areas experiencing frequent degradation of visibility such as offshore oil rigs (e.g. fog), desert installations (e.g. sand and dust) and Arctic/Antarctic installations (e.g. snow).

SUMMARY OF THE INVENTION

A method for determining position of an aircraft with respect to a ground station according to one aspect of the invention includes transmitting an electromagnetic signal from the aircraft. The signal includes a plurality of electromagnetic signals, each signal having a different selected frequency. The signal is detected at an array of sensors disposed on the ground surface in a selected pattern. The array includes at least one reference sensor and at least three spaced apart time difference determination sensors. A difference in arrival time of the signals between the reference sensor and each of the time difference determination sensors is determined and a spatial position of the aircraft is determined from the time differences.

Other aspects and advantages of the invention will be apparent from the following description and the appended claims.

BRIEF DESCRIPTION OF THE DRAWINGS

FIG. 2 shows a helicopter approaching the landing pad in FIG. 1, wherein an obstacle to navigation is present and may be in the path of electromagnetic signals. FIG. 2 also shows equipment on the helicopter including a forward altimeter, an aft altimeter and an electromagnetic signal transmitter.

DETAILED DESCRIPTION

1. General Description of the Principles of the Invention

The invention generally includes electromagnetic signal sensors disposed in a selected pattern on or about a helicopter landing pad which are able to provide with high accuracy the spatial (e.g., Cartesian x, y, z) positions of an electromagnetic signal (e.g., radio frequency) transmitter disposed on a helicopter. In this embodiment, the position and velocity vector of the helicopter may be determined to high precision relative to the coordinate system of the landing pad (with no loss of generality the landing pad may be assumed to be stationary) due to the long baselines available between the sensors.

Figure 7:
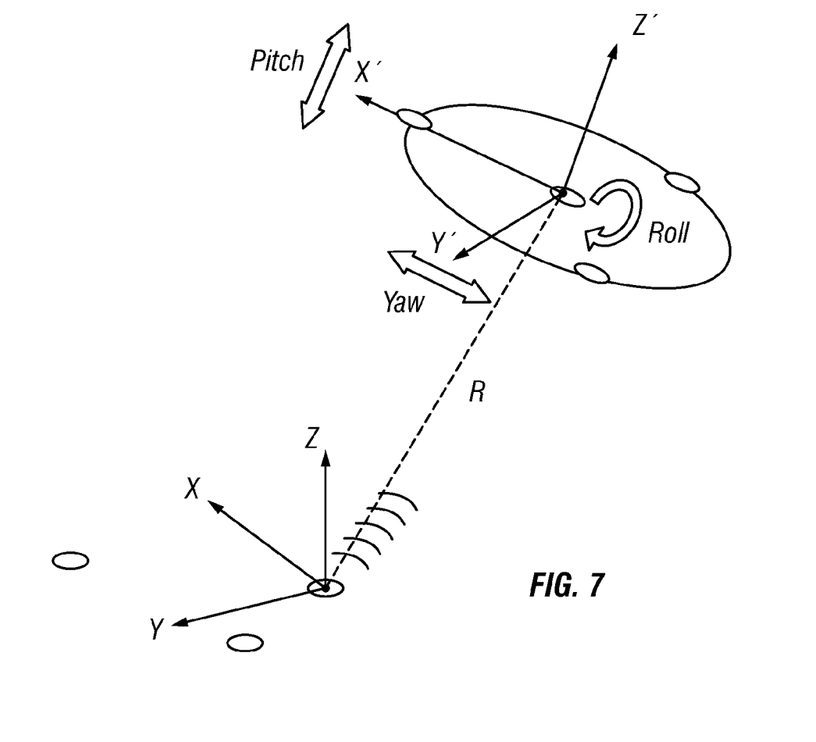
FIG. 7 shows the invention deployed as an integral part of the airframe of the helicopter being capable of determining the relative position vector R of one or more radio beacons in the stationary reference frame X, Y, Z of the landing pad relative to the moving reference frame X', Y', Z' of the helicopter. Calculating the Tait-Bryan angles between X, Y, Z and X', Y', Z' provides a measure of the orientation of the helicopter (pitch, yaw and roll angles). The time rate of change of the position vector R provides a measure of the helicopter velocity vector V (not shown for sake of clarity).

An alternative embodiment of the invention would see the invention deployed as an integral part of the airframe of the helicopter and one or more radio beacons deployed in the reference frame of the landing pad. (See FIG. 7) In this embodiment both the relative position and the relative orientation of the helicopter are measured with respect to the landing pad. In particular, the additional measurements of orientation are particularly important with respect to the safe operation of a helicopter in brownout conditions, as the loss of orientation cues is a major contributor to accidents. In aerospace applications, the orientation of an aircraft is defined by the so-called Tait-Bryan angles (related to the better known Euler angles) which are used to define the pitch, yaw and roll of the aircraft. If the landing pad is taken to be in the stationary reference frame X, Y Z (the desired final state of the aircraft)

and the moving reference frame X' Y' Z' of the helicopter is being dynamically measured by the invention, then bringing X' Y' Z' into coincidence with X, Y, Z by safe operation of the helicopter may be obtained by substituting the measured position and orientation of the aircraft for the position and orientation normally obtained visually by the pilot. The presentation of this data to the pilot must be easy and intuitive to interpret. This objective is provided by a host of available display options that are part of the art of flight instrumentation. In this alternative embodiment, where the distance measuring system is deployed on the aircraft, the baselines between the sensors are constrained by the dimensions of the aircraft, which limits the attainable accuracy of position relative to the landing pad. The accrued benefit of this latter embodiment is the additional orientation information provided to the pilot.

It is straightforward to combine these two embodiments and include the invention deployed both on the landing pad and in the helicopter. This could be envisaged for the case where both the landing pad reference system X, Y, Z and the helicopter reference system X', Y', Z' are moving; the application being landing a helicopter on board a water borne ship under low visibility conditions.

The height of the helicopter (Z) also may be obtained using an altimeter disposed at each of the forward and aft ends of the helicopter to provide greater confidence in the position information. As described above, it is possible to obtain height using the electromagnetic signal sensors, but the use of more sensors (e.g. altimeters, compasses, accelerometers, etc., individually or in combination) deployed as explained above also enables another means of determining the helicopter attitude (pitch) as well as (with additional sensors) yaw and roll. The alternate embodiment described above that allows both position and orientation of the helicopter to be measured reduces the need for additional sensors. One example of an altimeter suitable for use with the invention is a miniature radar altimeter. Commercially available altimeters of this type provide height determination accuracy of 2 cm.

In principle, an electromagnetic signal transmitter disposed on the helicopter transmits a frequency hopping signal, to be explained further below. The sensors deployed on or about the landing pad measure the phase difference between the signals received by three or more such sensors, distributed spatially, and a reference sensor. The phase difference is measured as a function of the hop frequency of the signal. The relationship of the phase difference with respect to the hop frequency of the signal enables determining the signal travel time delay between the arrivals of the electromagnetic signals at each sensor without ambiguity. This technique is known in the art as the "frequency hopping spread spectrum" technique for measuring time delays. Such time delays may be used to calculate the spatial position of the transmitter, and thus the helicopter, in three dimensions as a function of time delay. Such position information may easily be displayed as position, drift velocity and drift direction with respect to height. In some examples, the ground-deployed sensors can be moved onto the landing pad on a prepared frame for use, for example, only when adverse visibility conditions exist. The sensors do not need to be permanently mounted or affixed to the landing platform or pad.

A possible advantage of a method according to the invention is in its use of the slope of the phase difference with respect to the signal hop frequency to determine the time delay between the signal arrivals without ambiguity. The output position information can provide the helicopter pilot with the helicopter's rate of descent, absolute height above the ground with accuracies better than 30 cm, drift velocity with accuracy of better than 2 m/s and drift direction accuracy of better than 1 degree. The applications for this invention include, as non-limiting examples, landing pads on buildings, oil rigs and ships, lighthouses and sites of tactical military importance. That is, the invention may be used on any landing pad that is prepared and in ordinary use and which may be impacted by extreme weather conditions such as zero visibility by white-out, brownout of other low visibility conditions (including, e.g., degraded visibility environments (DVEs)). The invention may also be used on unprepared landing sites.

In some examples, e.g., "brownouts" due to dust raised by the helicopter itself, determining position may be of military importance when landing on unprepared sites. In such cases the pilot can select the landing site from above a height where the brownout exists. In one example, the pilot can lower a rope or cable C with the sensor array R coupled on the bottom end thereof (See FIG. 8) On reaching the ground, the sensor array R can unfold like an umbrella and the sensors R1, R2, R3, R4 can then be deployed in the predetermined pattern. Preferably the deployment device will include self leveling attitude compensator. The position determination device can include a communications line or cable C to the aircraft H. In some cases, an observer on the ground can ensure the position determination device R is deployed in the desired place. The pilot can then guide his craft landing on top of the device. On takeoff, the device R may be retrieved by the same cable C once the aircraft H has risen above the brownout condition.

Figure 1:
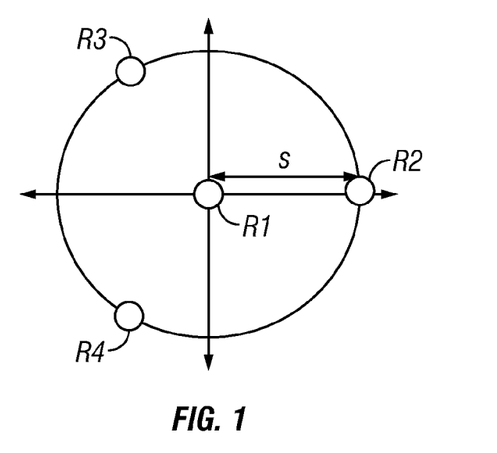
FIG. 1 shows an example deployment of electromagnetic signal receivers deployed on a helicopter landing pad.

In one example, the position determination device can include a transmitter operating at 2.4 GHz carrier frequency located on the helicopter which transmits a specific sequence of electromagnetic signal pulses. Each signal pulse in the pulse sequence can be a modulation of the carrier frequency at a different "hop" frequency, with hop frequencies being, for example, integral multiples of 1 MHz difference from the carrier frequency. Each pulse in the pulse sequence can be separated from the next pulse by a preselected time interval, for example a selected number of carrier frequency cycles (e.g., 6000 cycles) during which no signal transmission takes place. In the array of receivers or sensors deployed on the ground, one receiver acts as a reference sensor and may be located at the center of the device. The other three sensors or receivers may be, for example located on the circumference of a circle of predetermined radius (e.g., about 2 meters). FIG. 1 shows an example array of such sensors deployed as explained above. A reference sensor R1 is disposed in the middle of a circle of three other sensors R2, R3, R4. These satellite sensors R2, R3, R4 may be deployed circumferentially equally spaced and each may be a same selected distance s from the reference sensor R1. Other geometries for the array of sensors are also possible. Displacing the reference sensor R1 a selected distance above or below the plane of R2, R3, R4 can improve the accuracy of the determined position. Displacing the satellite sensors R2, R3, R4 from their nominal positions described above provides spatial diversity in the array that improves the response of the array to radio interference. Finally, additional satellite sensors (not shown) can also augment the spatial diversity of the array. The sensors R1, R2, R3, R4 can be electromagnetic (radio frequency) receivers of types known in the art. An example receiver is the superheterodyne receiver architecture that employs down-converting mixers to down-convert the radio carrier from its radio frequency (RF>1 GHz) to a lower intermediate frequency (IF<10 MHz) at which the phase differences may be most advantageously measured.

Simulations of operation of a system made according to the above general parameters indicate that the position location system should provide positional (e.g., in Cartesian x, y, z coordinates) accuracies of a few centimeters for all helicopter heights down to about 1 m when the spacing between each of the outer positioned sensors and the reference sensor, represented by s, greater than about 15 wavelengths of the electromagnetic signal carrier. That is, $s \geq 15\lambda (=1.9$ m at 2.4 GHz), wherein $\lambda$ represents the wavelength, the number of hop frequencies $n_{hop} \geq 50$, a hop frequency interval of $\Delta f_{hop}=1$ MHz, and standard error in measuring the phase differences of about 0.1 degrees.

Typical values of the size of the landing pad and a safety circle surrounding the pad are that the pad has dimensions of approximately 10 m diameter and the safety circle has a diameter of about 35 m.

The example geometry of the sensor array shown in FIG. 1 provides that the time delays between electromagnetic signal arrivals at any two sensors and that at the reference sensor are obtained by measuring the phase differences as a function of the hop frequency. The choice of s must be such that the phase difference does not exceed $2\pi$ as the hop frequency goes through its range. For a given hop frequency interval, the maximum value of s to avoid exceeding a phase difference of $2\pi$ is:

$$s < \frac{c}{2 n_{hop} \Delta f_{hop}}$$

where $c=3 \cdot 10^8$ meters per second. If, for example, $\Delta f_{hop}$ is chosen as 1 MHz and the number of hops is $n_{hop}=50$, then the maximum value of $s=3$ m. In such case any choice of $s<3$ m that will provide sufficiently accurate time delay measurement will be acceptable. The shorter the sensor spacing, s, the greater the fractional time error will be due to uncertainties in the phase centers of the sensors. The ultimate system accuracy will depend on the accuracy of the phase difference measurements, the hop frequency interval, the carrier frequency and the sensor spacing s. From simulations it appears to be the case that spacings of 10 wavelengths or greater would be appropriate. At 2.4 GHz this would be about 1.25 m.

Figure 2:
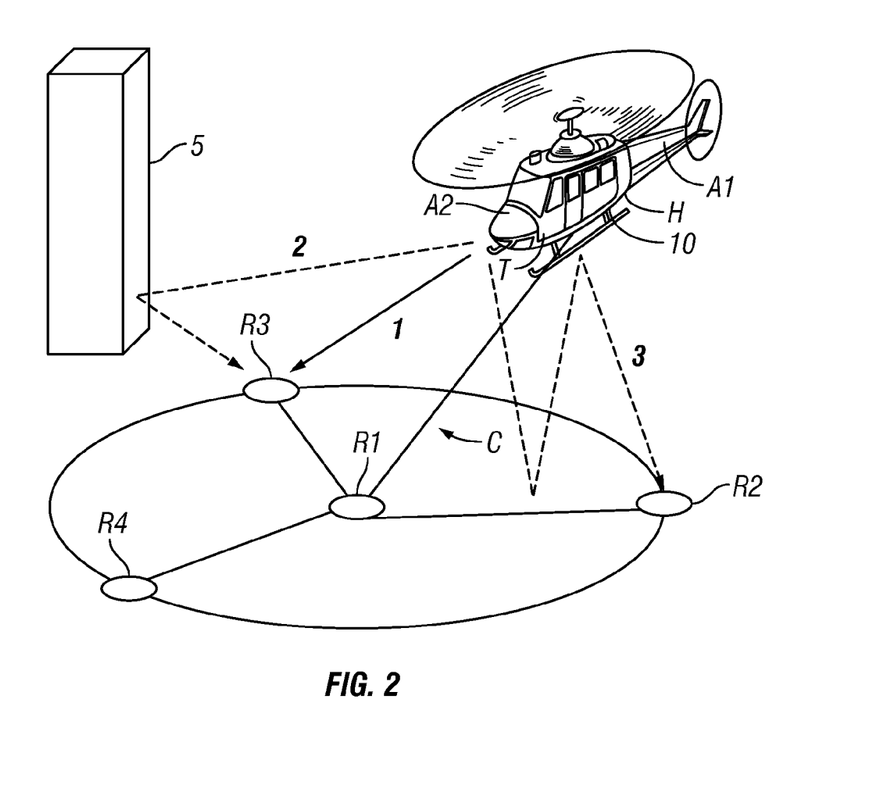

It is important to avoid the complications of multiple reflections of the transmitter signals. The system of the invention overcomes such complications by suitably selecting the position and size of the sensor array on the ground, the number of carrier frequency cycles used for each hop frequency and having a transmission break between each hop frequency transmission, and the number of sensors in the array. The array is shown as having four sensors in the various examples shown in the figures. It should be understood that more than four sensors may be used in other examples advantageously. Referring to FIG. 2, an example position determination system is shown schematically. An electromagnetic signal transmitter T as explained above is deployed on a helicopter H. The helicopter may also include, as explained above, a forward altimeter A2 and an aft altimeter A1 to measure height above the ground of the forward and aft ends of the helicopter H. The sensors (receivers R1, R2, R3, R4) are deployed as explained above. A signal cable C may connect the output of the receivers R1, R2, R3, R4 to a signal generation and processing unit 10 disposed in the helicopter H. The signal radiated from the transmitter T can reach the sensors R1, R2, R3, R4 by a direct travel path 1, be reflection from nearby objects 2, such as an obstacle to navigation 5, and increasingly important as the helicopter approaches the ground, by scatter 3 (multiple reflections) from the helicopter H itself.

Figure 3:
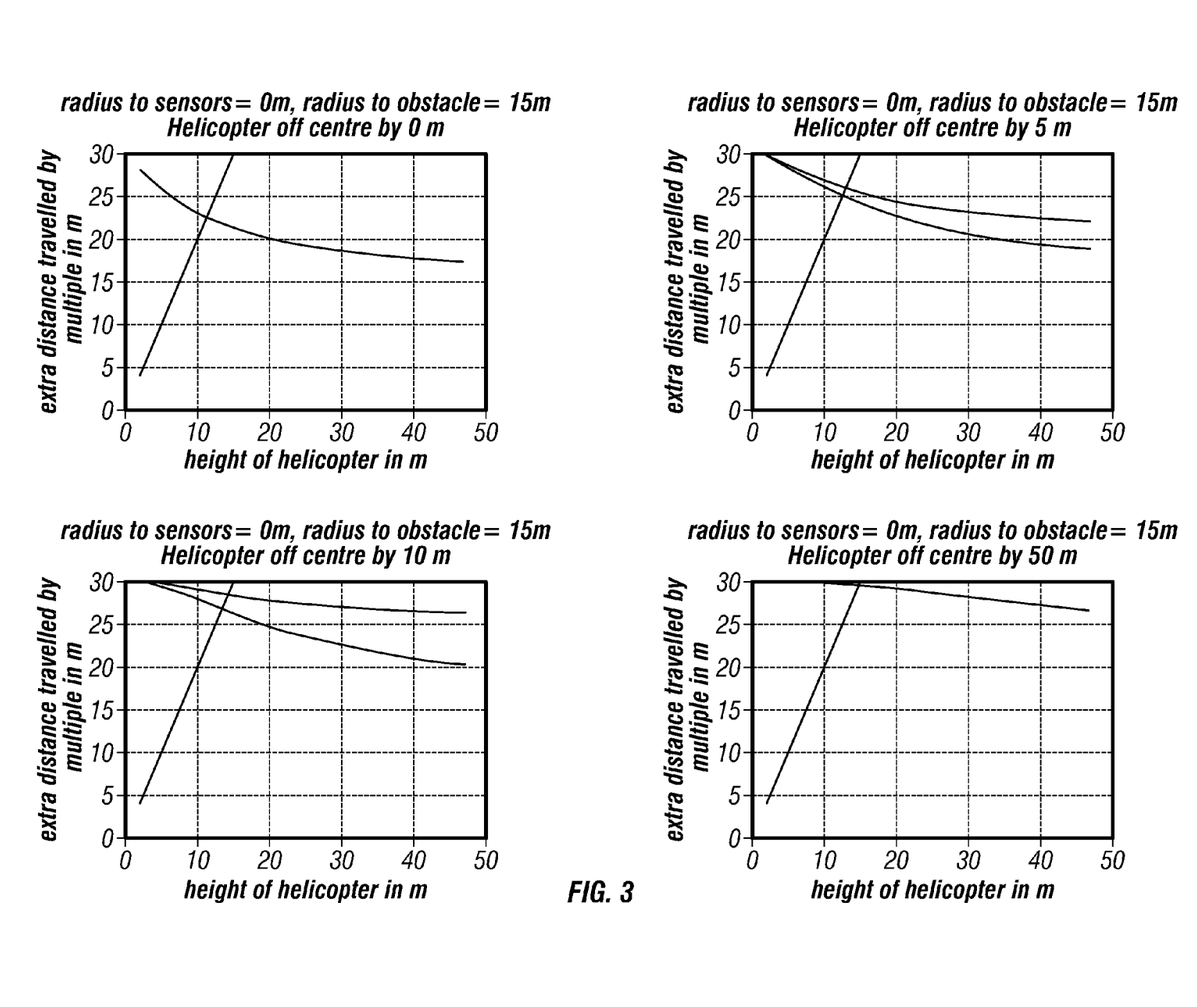
FIG. 3 shows graphs of the extra path traveled by multiple signal reflections at various helicopter distances from the center of the array shown in FIG. 1.

FIG. 3 shows graphs of the extra distance traveled by the electromagnetic signal when propagating along the indirect travel paths indicated in the diagram of FIG. 2. The free-time between the direct signal arrival and the first multipath arrival is used to accommodate the transmitted signal duration. The data of FIG. 3 are collected in FIG. 4 to show that as the aircraft height reduces, so the free-time due to obstacles becomes longer, but the free time due to signal scatter from the helicopter itself becomes shorter. An adaptive approach could be used to alter the transmitted signal as more and less free-time is available. The larger the number of signal wavelengths which can be accommodated in the free-time, the more accurate the eventual helicopter position estimate will be. Once the minimum extra distance expected of indirect signal travel paths has been estimated, it can be used in the determining the lowest frequency that could reasonably be used or, having decided on a frequency, how many wavelengths can be used to estimate the phase differences.

Figure 4:
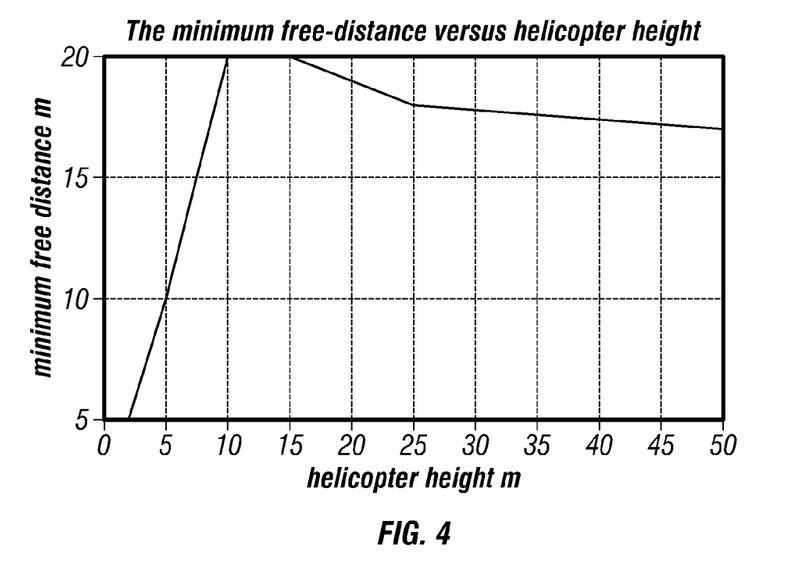
FIG. 4 shows a graph of the minimum free distance with respect to helicopter altitude.

Locating the sensor array to be near the center of the landing pad it appears that for helicopter heights greater than 10 m the minimum extra distance traveled by an indirect signal path is about 18 meters as shown in FIG. 4. Below 10 meters helicopter altitude, the free-time reduces to about 5 meters for the situation where the helicopter is 2.5 meters above the ground surface.

As previously explained, the accuracy with which the time delays can be measured depends on the of the sensor spacing, the number of hop frequencies, the hop frequency increment and the number of cycles available over which phase differences are measured. The larger each of these quantities is, the greater the accuracy of the time-delay estimate and thus the transmitter position. Simulations of operation of the above described system indicate positional accuracies of a few cm are obtained for all helicopter heights down to about 1 m for sensor spacing of $s \geq 15\lambda (=1.9$ m at 2.4 GHz), the number of hop frequencies $n_{hop} \geq 50$, a hop frequency interval of $\Delta f_{hop}=1$ MHz, and standard error in measuring the phase differences of better than 0.1 degrees of phase.

A first factor which affects the choice of frequency is the number of cycles available over which the phase differences can be measured. Thus, a higher frequency can provide better accuracy. A suggested frequency is one used widely in Bluetooth devices. This frequency is 2.4 GHz, which has a wavelength of 12.5 cm. For helicopter altitudes above 10 meters, the duration over which the phase can be measured will be about 10 meters/0.125 meter wavelength or 80 cycles. Below 10 meters altitude, the duration over which the phase can be measured will reduce to about 2.5 meters/0.125 meter wavelength or 20 cycles. The accuracy obtained by measuring over this varying number of cycles can be increased by increasing suitably the number of hop frequencies, the size of the frequency hop interval and the separation of the sensors.

Interference with the operation of other radio frequency devices is expected to be small as the signal will be low power, low duty cycle and will be frequency hopping.

The transmitted signal may consist of, for example, a first 20 cycle pulse at frequency $f_0$ followed by a time interval during which no transmission takes place, followed by 20 cycles at $f_0+\Delta f_{hop}$ until the required number of hop frequencies have been used, as an example, of the order of 50. The no-transmission breaks may be about 6000 cycles between 20 cycle pulses. The hop frequency sequencing need not be linear, but could follow a predetermined protocol defined for security/interference reasons.

The reason for the break in transmission is that following the 20 cycles of the one hop frequency there will be multiple arrivals of that hop frequency as described before. The break in transmission should be long enough for the multiple arrivals to have reduced in amplitude by about 60 dB before the next hop frequency is transmitted. The example number of cycles for the transmission breaks as indicated above is based on such attenuation of multiple travel path signals.

As the free-time reduces with reducing height below 10 meters altitude, there is no need to adjust the transmitted signal. The adaptation to the reduced free-time is that the processing only uses the maximum number of cycles for that altitude in which multiple travel path signals are substantially attenuated.

A sequence of 50 hop frequencies with 20 cycle duration at each hop frequency at a frequency of say 2.4 GHz with transmission breaks of 6000 cycles would last for about 0.125 msec. During this time the actual position of the transmitter on the helicopter will not have moved by more than 3 mm, even at speeds of up to 50 mph (22.5 m/s). Thus it is to be expected that the time to provide the coordinate position of the transmitter on the helicopter (H in FIG. 2) would be dominated by the processing time rather than duration of the transmit signal and its travel time. The processing is relatively simple, as will be explained below, and the coordinate position values should be determinable many times per second. A running Kalman-type filter could thus be implemented to give the pilot his position, his drift speed and drift direction together with attitude information (if the altimeters are implemented in the first embodiment above, or if the sensor array is deployed in the airframe of the helicopter as stated with reference to the second embodiment above).

Figure 5:
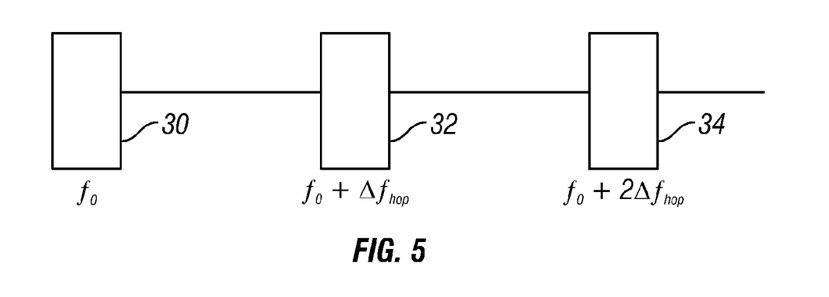
FIG. 5 shows an example signal transmission sequence.

An example electromagnetic signal pulsing sequence is shown in FIG. 5, wherein a first pulsing sequence 30 at a first frequency of about 20 cycles is transmitted, followed by a second sequence 32 of 20 cycles at a second frequency $f_0+\Delta f_{hop}$ after a delay period (e.g., 6000 cycles) in which no signal is transmitted. The second sequence may be followed, after a similar delay period, by a third sequence 34 of 20 cycles at a third frequency $f_0+2\Delta f_{hop}$. The example pulsing sequence shown in FIG. 5 is only one example of pulsing sequences that may be used in accordance with the invention.

The foregoing description of the invention includes having the receiving sensors deployed on the ground and locating one transmitter on the helicopter with at least one, and preferably two or more, altimeters to provide measures of pitch, yaw and roll. The minimum additions to the helicopter would be the transmitter and an accurate altimeter. If the transmitter were disposed on the ground then the helicopter would need the receiving sensors plus at least one accurate altimeter. Again, the ground transmitter could be deployed when LVE conditions occur. The positional data obtained from the three sensors would already be on the helicopter. The main unknown is the multiple signal travel path effects of the helicopter itself. Therefore, it is advantageous in implementing the invention that the receiving sensors are deployed on the ground and the transmitter is deployed aboard the helicopter.

Figure 6:
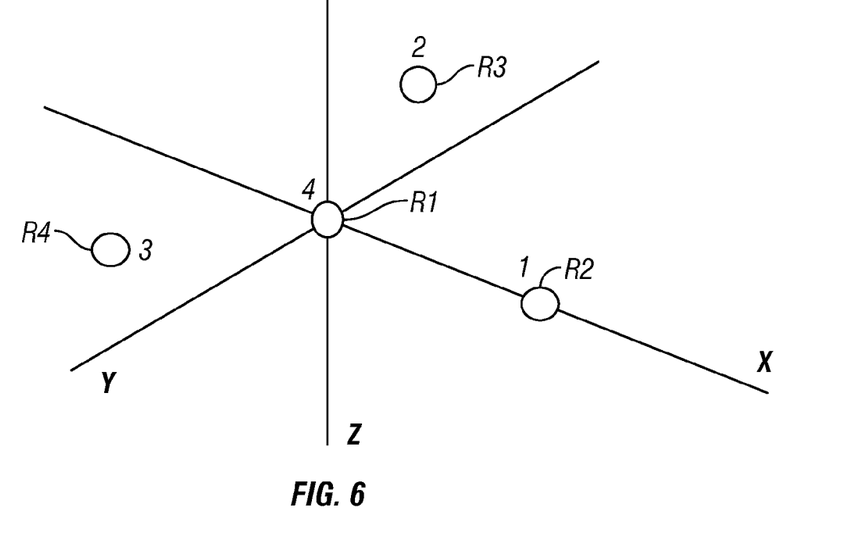
FIG. 6 shows an example location coordinate system with reference to the array of sensors shown in FIG. 1.

The description and equations below are for the example arrangement of the sensors shown in FIG. 6. Suitable equations can be readily developed for other sensor deployment geometries. Considering the arrangement of sensors as shown in FIG. 1, the equations for the near-field case follow below. The slant range from the transmitter position (x, y, z) to the reference sensor R1 may be determined by the expression:

$$D=\sqrt{(x^2+y^2+z^2)}$$

The distances from the transmitter position (x, y, z) to the other sensors R2, R3, R4 are given by the equations:

$$dR2=\text{sqrt}((x-s)^2+y^2+z^2);$$

$$dR3=\text{sqrt}((x+sa)^2+(y-sb)^2+z^2);$$

$$dR4=\text{sqrt}((x+sa)^2+(y-sb)^2+(z)^2);$$

where each sensor R2, R3, R4 is located at a distance s from the reference sensor R1 and $a=\cos(30°)$ and $b=\cos(60°)$. The time delays, expressed as distances, may be calculated by the expressions:

$$mR2=(D-dR2)$$

$$mR3=(D-dR3)$$

$$mR4=(D-dR4)$$

Using the equations:

$$mR2=D-\sqrt{((x-s)^2+y^2+z^2)}$$

$$mR3=D-\sqrt{((x+sa)^2+(y-sb)^2+z^2)}$$

$$mR4=D-\sqrt{((x+sa)^2+(y+sb)^2+z^2)}$$

the following 3 equations can be constructed where the $\alpha_i$ and $\beta_i$ can be expressed in terms of the above three distances $m_i$, a and b and s:

$$x=\alpha a_1 D+\beta_1$$

$$y=\alpha_2 D+\beta_2$$

$$y=\alpha_3 D+\beta_3$$

Thus a linear equation for D can be found as:

$$D = \frac{\beta_3 - \beta_2}{\alpha_2 - \alpha_3}$$

The above equation can be used directly for an estimate of D, and then x and y are obtained from the above equations. z may be obtained from the equation:

$$z=\sqrt{(D^2-x^2-y^2)}$$

In the present example it is expected that the altimeter will also provide z so it may only be necessary to solve a quadratic equation to obtain D where z is otherwise obtained.

$$D^2(\alpha_1^2+\alpha_2^2-1)+3D(\alpha_1\beta_1+\alpha_2\beta_2)+\beta_1^2+\beta_2^2+Z^2=0$$

and then use the expressions:

$$x=\alpha_1 D+\beta_1$$

$$y=\alpha_2 D+\beta_2$$

It has been determined that the preferred technique for determining z above a certain helicopter altitude is to use the altimeter measurement and the quadratic equation above to obtain D with the value of D from the sensor array used to select the correct solution. Below this height the value of D can be obtained as explained above from the sensor array. Essentially, if the phase difference between two sensors as a function of frequency is known then the slope of the relationship gives the time delay between the sensors. If the phase difference between sensors separated by a baseline of N wavelengths becomes greater than $2\pi$ as the frequency varies then an unwrapping of the phase difference would be necessary. Phase unwrapping can be implemented, but it is preferable to be avoid phase unwrapping by limiting the distance between the reference sensor and the outer sensors.

To establish whether the phase difference for a baseline of N wavelengths is less than $2\pi$ as the hop frequency runs through its range. Let the baseline be N wavelengths. Then the phase difference can be calculated by the expression:

$$\Delta\phi = kd\cos\theta = \frac{2\pi fd}{c}\cos\theta = 2\pi N\cos\theta$$

Then the change in the phase difference for a fractional frequency change is determined by the expression.

$$\Delta(\Delta\phi) = \Delta\phi\frac{\Delta f}{f}$$

There are $n_{hop}$ frequencies at $\Delta f_{hop}$ intervals from the central frequency $f_0$, po the maximum shift in phase difference for a fixed baseline due to change in frequency is $$\Delta(\Delta\phi) = \Delta\phi\frac{n_{hop}\Delta f_{hop}}{f_0}$$

If the phase difference is $\Delta\phi$ then the resulting extent of the phase difference is due to frequency changes is thus given by the expression:

$$\Delta\phi_{range} = 2\frac{n_{hop}\Delta f_{hop}}{f_0}(2\pi N\cos\theta)$$

If the phase difference for one frequency is close to $2\pi$, then this is the only boundary it can cross. So as the phase difference with respect to frequency is calculated to obtain the time delay it may occasionally have to make a single adjustment of $2\pi$, but never more than one such adjustment.

The slope of a straight line through the phase difference versus hop frequency data is calculated in a least squares manner and provides the estimate of the time delay. If each point on the phase difference versus frequency plot has a standard error of a, then the standard error of the time delay estimate is:

$$\Delta t = \left(\sqrt{12a^2/(n_h(n_h^2-1))}\right)\frac{1}{2\pi\Delta f_{hop}}$$

where $n_h$ is the number of hop frequencies used and $\Delta f_{hop}$ is the increment between hop frequencies.

If more than four difference determination sensors are used, such sensors can be arranged in a regular, irregular or random array geometry.

Figure 8:
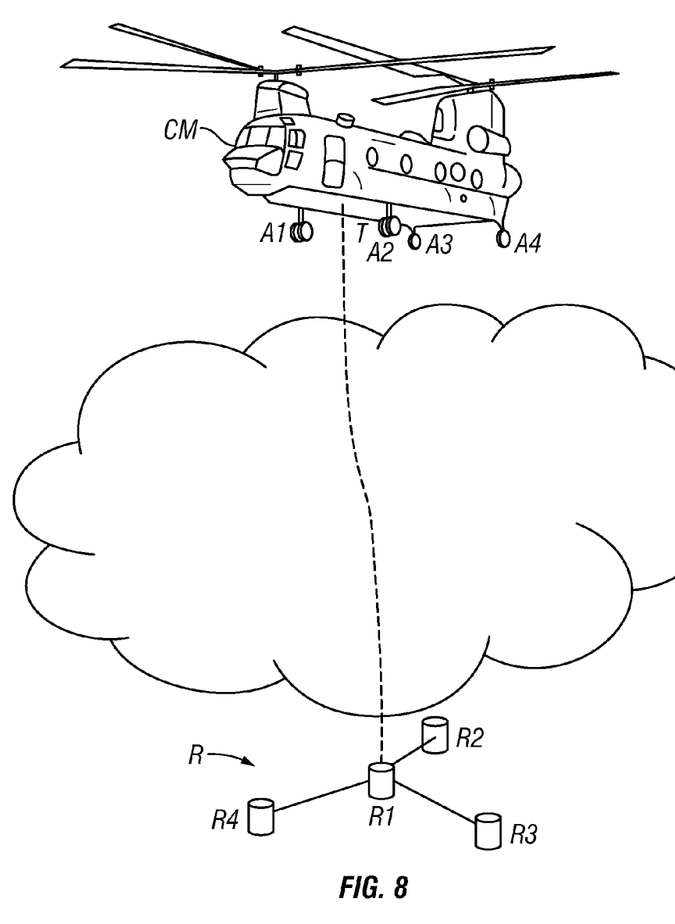
FIG. 8 shows deployment of the invention using a tether from a helicopter hovering above the brownout condition.

In still other examples, and with reference to FIG. 8, the pitch and roll angles may be resolved by the use of four spatially displaced accelerometers, A1, A2, A3, A4. Yaw angle may be determined by the aircraft's compass. Using such configuration may enable the use of the ground based receivers and time difference calculation while enabling the aircraft to land in relatively known attitude. Such configuration may reduce the amount of additional instrumentation required to be affixed to the aircraft.

The invention may enable a helicopter pilot to approach a landing pad in DVEs safely.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining position of an aircraft with respect to a ground station, comprising:
    transmitting a signal from the aircraft, the signal comprising a plurality of electromagnetic signals, each signal having a different selected frequency, wherein transmission of each frequency is followed by a time interval of no transmission such that multiple path signals have decreased in amplitude by a predetermined amount;
    detecting the signals at an array of sensors disposed on the ground surface in a selected pattern, the array including at least one reference sensor and at least three spaced apart phase difference determination sensors;
    determining a difference in phase of the signals between the reference sensor and each of the phase difference determination sensors by determining a relationship between frequency and phase difference between signals detected by the reference sensor and each time difference determination sensor at each of a plurality of frequencies without using a time reference between sensors; and
    determining a spatial position of the aircraft from the time differences.

2. The method of claim 1 wherein the phase difference determination sensors are disposed on a circle having a selected radius from a position of the reference sensor.

3. The method of claim 1 wherein more than four difference determination sensors are used, and such sensors are arranged in a regular, irregular or random array geometry.

4. The method of claim 1 wherein the selected pattern of the spaced apart time difference determination sensors comprises a circle having a radius such that the phase difference does not exceed the value $2\pi$ when the aircraft is within a predetermined distance from the array.

5. The method of claim 1 further comprising deploying the array of sensors from the aircraft prior to landing thereof.

6. The method of claim 1 further comprising measuring an altitude of the aircraft at a plurality of spaced apart positions and a geodetic orientation of the aircraft thereof, and calibrating an altitude determined from the spatial position using the measured altitudes.

7. A method for determining position of an aircraft with respect to a ground station, comprising:
    transmitting a signal from the ground station, the signal comprising a plurality of electromagnetic signals, each signal having a different selected frequency, wherein transmission of each frequency is followed by a time interval of no transmission such that multiple path signals have decreased in amplitude by a predetermined amount;
    detecting the signals at an array of sensors disposed on the aircraft in a selected pattern, the array including at least one reference sensor and at least three spaced apart phase difference determination sensors;
    determining a difference in arrival time of the signals between the reference sensor and each of the phase difference determination sensors by determining a relationship between frequency and phase difference between signals detected by the reference sensor and each time difference determination sensor at each of a plurality of frequencies without using a time reference between sensors; and determining a spatial position of the aircraft from the time differences.

8. The method of claim 7 wherein the phase difference determination sensors are disposed on a circle having a selected radius from a position of the reference sensor.

9. The method of claim 8 wherein the selected radius is such that the phase difference does not exceed the value $2\pi$ when the aircraft is within a predetermined distance from the array.

10. The method of claim 7 further comprising measuring an altitude of the aircraft at a plurality of spaced apart positions and a geodetic direction thereof, and calibrating an altitude determined from the spatial position using the measured altitudes.

11. A method for determining position of an aircraft with respect to a ground station, comprising:
    transmitting a signal from the aircraft, the signal comprising a plurality of electromagnetic signals, each signal having a different selected frequency;
    detecting the signals at an array of sensors disposed on the ground surface in a selected pattern, the array including at least one reference sensor and at least three spaced apart time difference determination sensors, the array deployed from the aircraft prior to landing;
    determining a difference in arrival time of the signals between the reference sensor and each of the time difference determination sensors; and
    determining a spatial position of the aircraft from the time differences.

12. The method of claim 11 wherein the time differences are determined by determining a relationship between a frequency of the signal and a phase difference between signals detected by each of the sensors.

13. The method of claim 11 wherein the time difference determination sensors are disposed on a circle having a selected radius from a position of the reference sensor.

14. The method of claim 11 wherein more than four difference determination sensors are used, and such sensors are arranged in a regular, irregular or random array geometry.

15. The method of claim 11 wherein the selected radius is such that the phase difference does not exceed the value $2\pi$ when the aircraft is within a predetermined distance from the array.

\* \* \* \* \*